(12) United States Patent
Taki

(10) Patent No.: US 9,884,458 B2
(45) Date of Patent: Feb. 6, 2018

(54) MANUFACTURING METHOD OF TANK

(71) Applicant: TOYOTA JIDOSHA KABUSHIKI KAISHA, Toyota-shi, Aichi-ken (JP)

(72) Inventor: Masayoshi Taki, Konan (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 11 days.

(21) Appl. No.: 15/159,965

(22) Filed: May 20, 2016

(65) Prior Publication Data
US 2016/0354970 A1 Dec. 8, 2016

(30) Foreign Application Priority Data
Jun. 2, 2015 (JP) ................................ 2015-111902

(51) Int. Cl.
| | |
|---|---|
| *F17C 1/06* | (2006.01) |
| *B29C 70/32* | (2006.01) |
| *B29C 53/60* | (2006.01) |
| *B29K 101/12* | (2006.01) |
| *B29K 63/00* | (2006.01) |

(Continued)

(52) U.S. Cl.
CPC ............ *B29C 70/32* (2013.01); *B29C 53/602* (2013.01); *B29C 63/0013* (2013.01); *B29K 2063/00* (2013.01); *B29K 2101/12* (2013.01); *B29K 2105/0872* (2013.01); *B29L 2009/00* (2013.01); *B29L 2031/7156* (2013.01); *B65D 90/029* (2013.01); *F17C 1/02* (2013.01); *F17C 1/06* (2013.01); *F17C 2201/0109* (2013.01); *F17C 2203/0663* (2013.01); *F17C 2209/2163* (2013.01)

(58) Field of Classification Search
CPC ........... B29L 2031/7156; B65D 90/029; F17C 2201/0109; F17C 1/00–1/16; F17C 2203/0663; F17C 2203/0665; F17C 2203/0668; F17C 2203/067; F17C 2209/2163; B29C 70/32
USPC ................... 156/293, 294; 220/581, 589, 590
See application file for complete search history.

(56) References Cited

U.S. PATENT DOCUMENTS

| | | | |
|---|---|---|---|
| 6,190,598 B1 * | 2/2001 | Murphy | ................ B29C 70/342 264/314 |
| 6,361,635 B1 | 3/2002 | Ayorinde | |

(Continued)

FOREIGN PATENT DOCUMENTS

| | | |
|---|---|---|
| DE | 102011121987 A1 | 6/2013 |
| DE | 112012002720 T5 | 4/2014 |

(Continued)

OTHER PUBLICATIONS

English translation of Notification of Reasons for Refusal issued in JP2015-111902 on Jul. 24, 2017.

*Primary Examiner* — Carson Gross
(74) *Attorney, Agent, or Firm* — Finnegan, Henderson, Farabow, Garrett & Dunner, LLP

(57) ABSTRACT

There is provided a manufacturing method of a tank including a liner. The manufacturing method comprises (A) a process of winding fibers in a sheet-like form impregnated with a resin on a mandrel having a higher rigidity than rigidity of the liner and heating and curing the wound fibers in the sheet-like form to form a sheet layer; (B) a process of pulling out the mandrel from the sheet layer; and (C) fitting the liner into the sheet layer, after the process (B).

4 Claims, 4 Drawing Sheets

(51) Int. Cl.
  *B29K 105/08* (2006.01)
  *B29L 9/00* (2006.01)
  *B29L 31/00* (2006.01)
  *B65D 90/02* (2006.01)
  *F17C 1/02* (2006.01)
  *B29C 63/00* (2006.01)

(56) References Cited

U.S. PATENT DOCUMENTS

2006/0065664 A1* 3/2006 Ohta .................. B29C 53/602
                                                             220/588
2012/0012593 A1    1/2012  Kuroiwa et al.
2012/0090718 A1    4/2012  Kawasetsu et al.
2014/0131365 A1    5/2014  Miyoshi et al.
2014/0352873 A1   12/2014  Bork et al.

FOREIGN PATENT DOCUMENTS

| JP | S52-020684 B | 6/1977 |
| JP | 9-323365 | 12/1997 |
| JP | 2010-261468 A | 11/2010 |
| JP | 2010-265931 | 11/2010 |

* cited by examiner

MANUFACTURING METHOD OF TANK

CROSS-REFERENCE TO RELATED APPLICATIONS

The present application claims priority from Japanese patent application No. 2015-111902 filed on Jun. 2, 2015, the content of which is hereby incorporated by reference into this application.

BACKGROUND

Field

The present invention relates to a manufacturing method of a tank.

Related Art

A filament winding method (hereinafter referred to as "FW method") is known as a manufacturing method of a high-pressure tank that is configured to store a fuel and is used for, for example, a natural gas vehicle or a fuel cell vehicle. The manufacturing method of the tank by the FW method winds reinforced fibers that are impregnated with a thermosetting resin such as epoxy resin on the outer circumference of a liner and heats and cures the thermosetting resin to form a reinforcement layer. For example, the technique disclosed in JP 2010-265931A employs the FW method to wind a fiber bundle on the liner by helical winding and additionally winds fibers in a sheet-like form (hereinafter referred to as "fiber sheet") on the helical winding layer to form a reinforcement layer.

Applying a high tensile force to the fiber sheet in the process of winding the fiber sheet with a view to reducing deflection of the fiber sheet, the tensile force is likely to exceed the rigidity of the liner and deform the liner. There is accordingly a need for a technique that forms a tank with high accuracy by using a fiber sheet.

SUMMARY

In order to solve at least part of the above problems, the invention may be implemented by any of the following aspects.

(1) According to one aspect of the invention, there is provided a manufacturing method of a tank including a liner. The manufacturing method comprises (A) a process of winding fibers in a sheet-like form impregnated with a resin on a mandrel having a higher rigidity than rigidity of the liner and heating and curing the wound fibers in the sheet-like form to form a sheet layer; (B) a process of pulling out the mandrel from the sheet layer; and (C) fitting the liner into the sheet layer, after the process (B). The manufacturing method of this aspect winds the fibers in the sheet-like form on the mandrel having the higher rigidity than the rigidity of the liner. This enables the fibers in the sheet-like form to be wound with a higher tensile force, compared with a method of winding the fibers in the sheet-like form on the liner. This accordingly reduces deflection of the sheet layer and allows for formation of the tank with high accuracy.

(2) in the manufacturing method of the above aspect, the liner may have a straight portion formed in a cylindrical shape and curved dome portions provided on respective ends of the straight portion. The manufacturing method may further comprise (D) a process of working respective ends of the sheet layer to a shape along shapes of outer surfaces of the dome portions, after the process (A). The manufacturing method of this aspect works the respective ends of the sheet layer to the shape along the shapes of the outer surfaces of the dome portions. This improves the shape accuracy of the tank.

(3) The manufacturing method of the above aspect may further comprise (E) a process of winding a fiber bundle on the liner with applying a pressure to inside of the liner, after the process (C). The manufacturing method of this aspect enables the liner to be held from the inside by the pressure in the process of winding the fiber bundle. This improves the shape accuracy of the tank.

The invention may be implemented by any of various aspects other than the aspects of the manufacturing method of the tank described above. For example, the invention may be implemented by aspects of a tank and a manufacturing apparatus of the tank.

DETAILED DESCRIPTION

A. Embodiment

Figure 1:
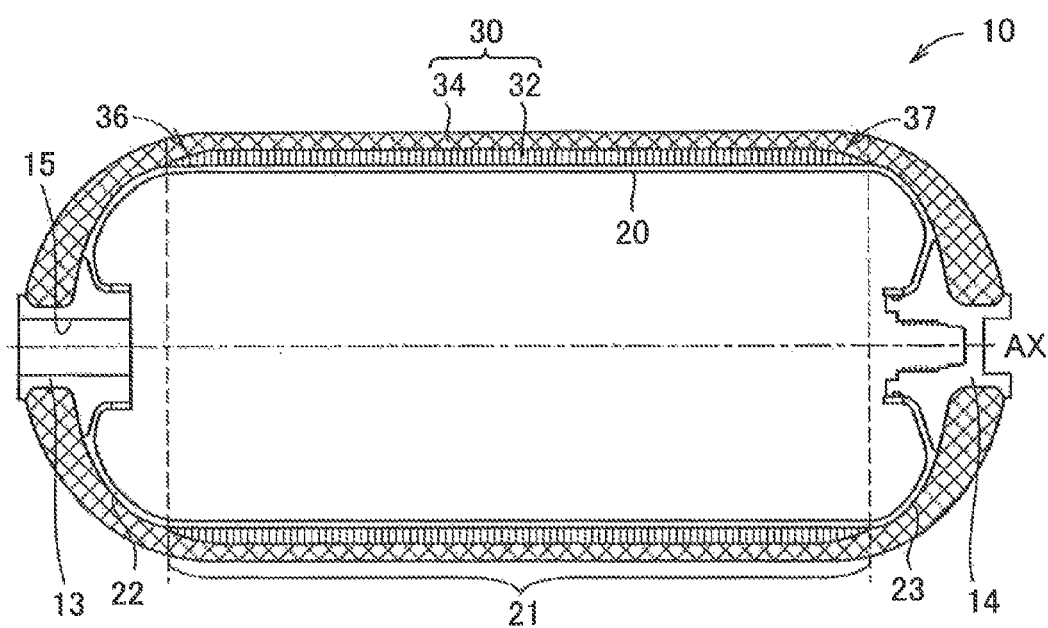
FIG. 1 is a sectional view illustrating the schematic configuration of a tank.

FIG. 1 is a sectional view illustrating the schematic configuration of a tank 100 manufactured by a manufacturing method according to one embodiment of the invention. The tank 10 of the embodiment stores, for example, high-pressure hydrogen gas of about 70 MPa. The tank 10 includes a liner 20 and a reinforcement layer 30.

The liner 20 is a resin hollow liner. The liner 20 is made of, for example, a thermoplastic resin such as polyethylene, nylon, polypropylene or polyester. The liner 20 has a straight portion 21, dome portions 22 and 23 and mouthpieces 13 and 14. The straight portion 21 is formed in a cylindrical shape. The dome portions 22 and 23 are provided on the respective ends of the straight portion 21 and are formed in a curved shape that is convex outward of the liner 20. The mouthpieces 13 and 14 made of a metal such as aluminum or stainless steel are provided on the respective apexes of the dome portions 22 and 23. One mouthpiece 13 has a through hole 15 that is used to take the gas from the tank 10 and refill the gas into the tank 10. The other mouthpiece 14 is used to rotate the liner 20 for reinforcement of the liner 20 or formation of the reinforcement layer 30. The mouthpiece 14 may be omitted as appropriate.

The reinforcement layer 30 is a layer provided to cover the circumference of the liner 20 and configured to reinforce the liner 20. The reinforcement layer 30 includes a sheet layer 32 and a helical layer 34. In the description hereafter, the sheet layer 32 may be called inner layer, and the helical layer 34 may be called outer layer.

The sheet layer 32 is provided by winding and stacking a fiber sheet multiple number of times on the outer surface of the straight portion 21 of the liner 20. The fiber sheet of this embodiment denotes fibers in a sheet form produced by impregnating glass fibers or carbon fibers that are aligned in one direction with a thermosetting resin such as epoxy resin. According to this embodiment, the fibers in the fiber sheet are aligned in a winding direction of the fiber sheet or in other words, the circumferential direction of the straight portion 21. The fiber sheet may include fibers extended in directions intersecting with the winding direction of the fiber sheet. In the description hereafter, the "sheet layer" may be called "hoop layer".

The helical layer 34 is provided by helically winding a fiber bundle on the sheet layer 32 and the dome portions 22 and 23. The fiber bundle of this embodiment is formed by bundling 10000 to 40000 glass fibers or carbon fibers and impregnating the bundled glass fibers or carbon fibers with a thermosetting resin such as epoxy resin.

The thickness of the sheet layer 32 and the thickness of the helical layer 34 are respectively set to adequate values according to the pressure resistance performance and the strength required for the tank 10.

Figure 2:
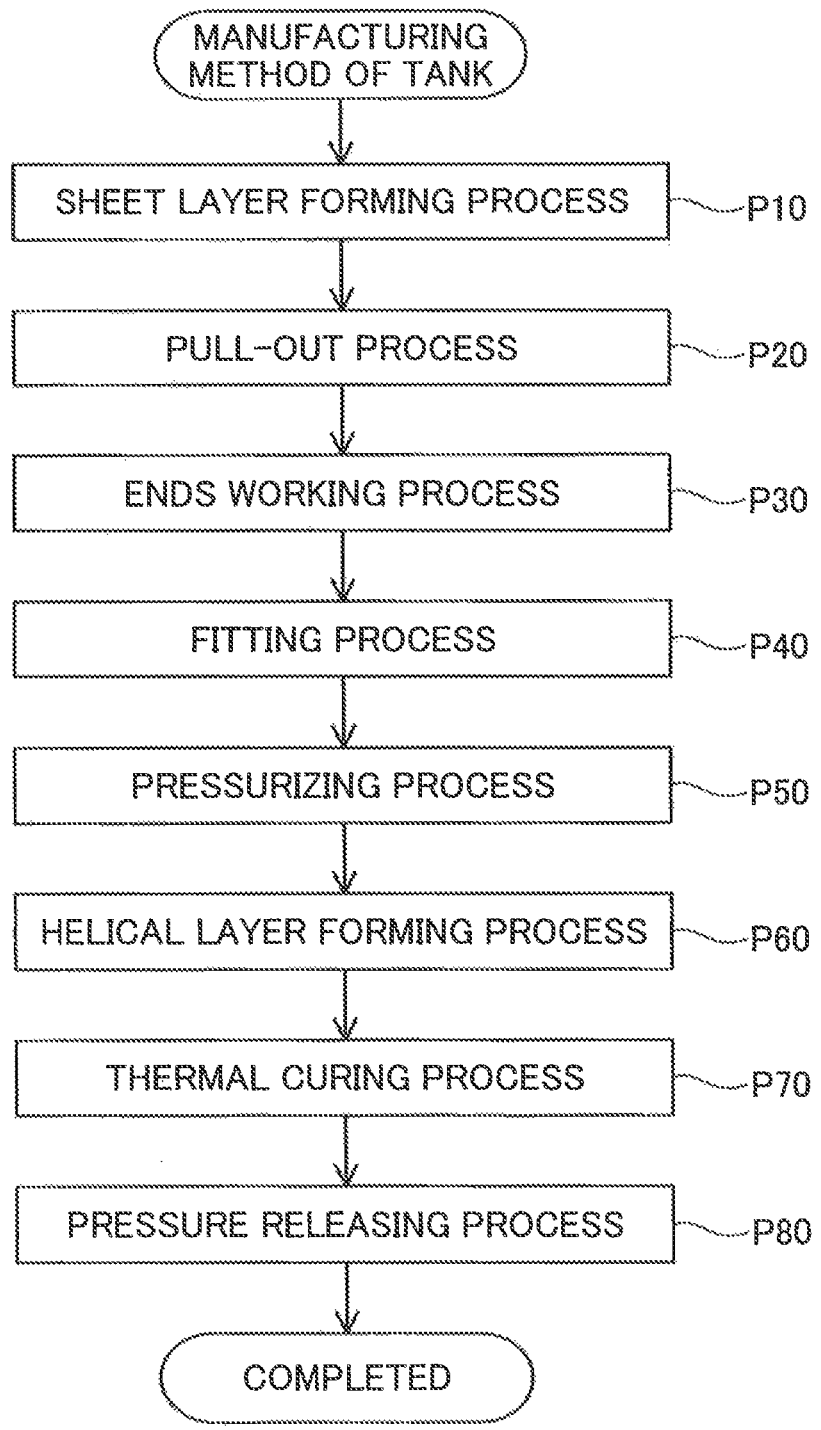
FIG. 2 is a process diagram showing a manufacturing method of the tank.

FIG. 2 is a process diagram showing a manufacturing method of the tank 10. The manufacturing method of this embodiment first performs a process of winding the fiber sheet on a mandrel (core metal) having the higher rigidity than that of the liner 20 to form the sheet layer 32 (process P10). This process P10 is also called sheet layer forming process.

Figure 3:
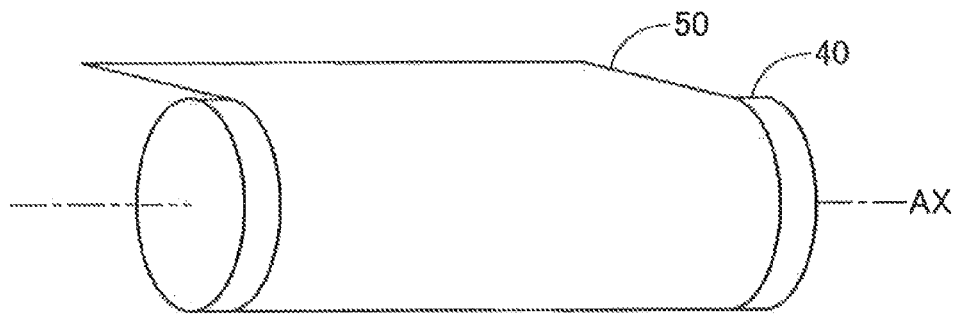
FIG. 3 is a diagram illustrating a sheet layer forming process.

FIG. 3 is a diagram illustrating the sheet layer forming process. The sheet layer forming process first provides a mandrel 40 as a mold of the sheet layer 32. The mandrel 40 is formed in a cylindrical shape from a metal such as stainless steel, iron or copper. The mandrel 40 has an outer diameter that is slightly larger (for example, by about 0.5 mm) than the outer diameter of the straight portion 21 of the liner 20. The mandrel 40 has a length along an axis AX that is longer than the length of the straight portion 21 of the liner 20. According to this embodiment, the mandrel 40 has the higher rigidity than the rigidity of the liner 20. More specifically, the mandrel 40 is made of a metal having the higher Young's modulus than that of the liner 20 made of resin, so as to have the higher rigidity than the rigidity of the liner 20. Another available technique makes the sectional area of the mandrel 40 greater than the sectional area of the liner 20 by, for example, providing the solid mandrel 40, so as to make the rigidity of the mandrel 40 higher than that of the liner 20. This latter technique causes the rigidity of the mandrel 40 to be higher than that of the liner 20 even when the liner 20 and the mandrel 40 are made of the same material.

After providing the mandrel, the manufacturing method subsequently winds a fiber sheet 50 along the circumferential direction of the mandrel 40 by a sheet winding method (hereinafter referred to as "SW method"). According to this embodiment, the fiber sheet 50 has a width that is equal to the length of the straight portion 21 of the liner 20 in the direction of the axis AX. The fiber sheet 50 has a thickness of about 0.4 mm. According to this embodiment, this fiber sheet 50 is wound on the mandrel 40 thirty times to form the sheet layer 32 having the thickness of about 12 mm.

Figure 4:
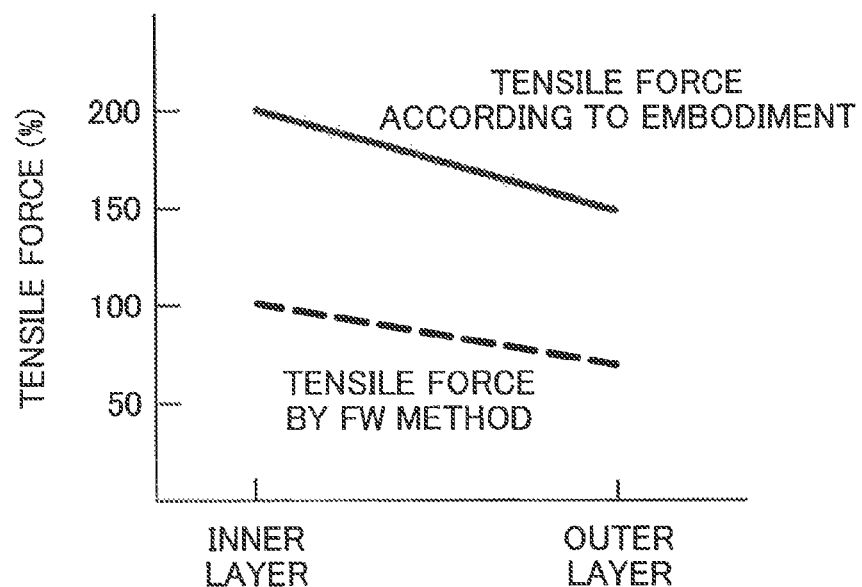
FIG. 4 is a diagram showing the tensile force applied to a fiber sheet.

FIG. 4 is a diagram showing the tensile force applied to the fiber sheet 50 in the course of winding the fiber sheet 50. According to this embodiment, the tensile force per unit width applied to the fiber sheet 50 by the SW method is made about twice the tensile force applied to the fiber bundle by the genera FW method. Additionally, according to this embodiment, the fiber sheet 50 is wound such that the outer layer of the sheet layer 32 has the lower tensile force. In other words, the fiber sheet 50 is wound such that a winding start of the fiber sheet 50 has the highest tensile force and a winding end of the fiber sheet 50 has the lowest tensile force.

The sheet layer forming process thermally cures the fiber sheet 50 after winding the fiber sheet 50 on the mandrel 40, so as to complete the sheet layer 32.

After completing the sheet layer 32, the manufacturing method performs a process of pulling the mandrel 40 out of the sheet layer 32 (process P20 in FIG. 2). This process P20 is also called "pull-out process".

Figure 5:
FIG. 5 is a sectional view illustrating a sheet layer after a mandrel is pulled out.

FIG. 5 is a sectional view illustrating the sheet layer 32 after the mandrel 40 is pulled out by the pull-out process. As shown in FIG. 5, the sheet layer 32 after pulling out the mandrel 40 is in a cylindrical form.

After the pull-out process, the manufacturing method performs a process of working respective ends 36 and 37 of the sheet layer 32 to a shape along the shapes of the outer surfaces of the dome portions 22 and 23 of the liner 20 (process P30 in FIG. 2). This process P30 is also called ends working process.

Figure 6:
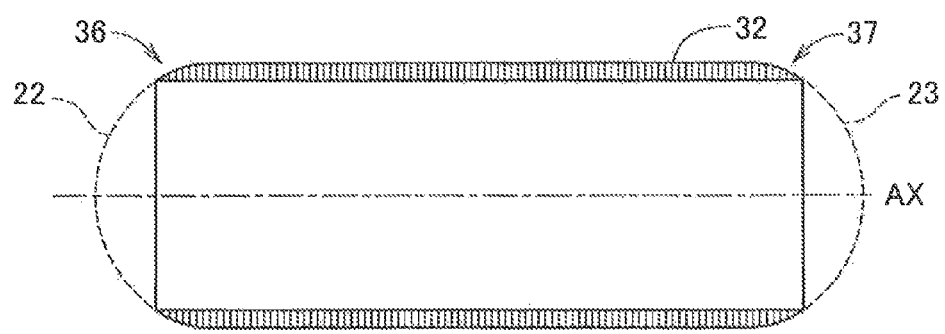
FIG. 6 is a sectional view illustrating the sheet layer after an ends working process.

FIG. 6 is a sectional view illustrating the sheet layer 32 after the ends working process. In the ends working process, the respective ends (ends 36 and 37) of the sheet layer 32 in the cylindrical form are worked to a shape along the outer surfaces of the dome portions 22 and 23 of the liner 20. The ends are worked by, for example, cutting work or grinding work. The worked surfaces of the respective ends 36 and 37 of the sheet layer 32 are required to have a shape substantially along the outer surfaces of the dome portions 22 and 23 and may not have such an accuracy that the curvatures of the worked surfaces are identical with the curvatures of the dome portions 22 and 23. The worked surfaces may be for example, inclined surfaces.

After working the ends of the sheet layer 32, the manufacturing method performs a process of fitting the liner 20 into the sheet layer 32 (process P40 in FIG. 20). This process P40 is also called fitting process.

Figure 7:
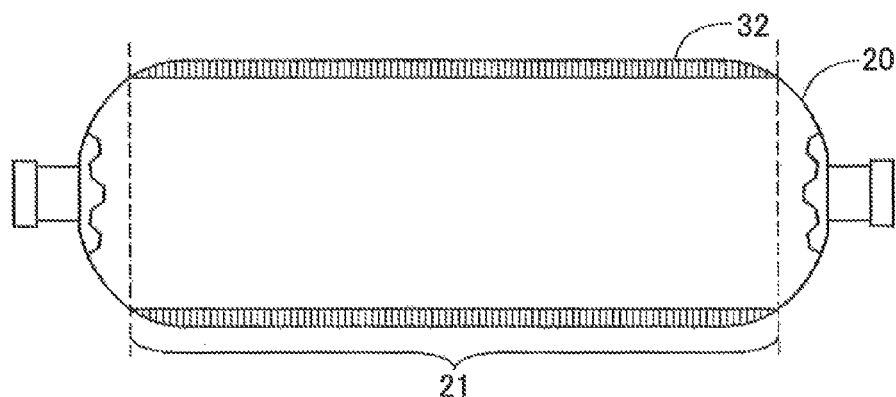
FIG. 7 is a schematic diagram illustrating the state that a liner is fit into the sheet layer.

FIG. 7 is a schematic diagram illustrating the state that the liner 20 is fit into the sheet layer 32 by the fitting process. According to this embodiment, the sheet layer 32 is formed by using the mandrel 40 that has the outer diameter slightly larger than the outer diameter of the straight portion 21 of the liner 20, so that the liner 20 can be readily fit into the sheet layer 32. In the case where the inner diameter of the sheet layer 32 is almost equal to the outer diameter of the straight portion 21 of the liner 20, the liner 20 may be cooled and contracted in advance before being inserted into the sheet layer 32.

After the fitting process, the manufacturing method performs a process of pressurizing inside of the liner 20 through the mouthpiece 13 to closely attach the outer surface of the straight portion 21 of the liner 20 to the inner surface of the sheet layer 32 (process P50 in FIG. 2). This process P50 is also called pressurizing process.

After the pressurizing process, the manufacturing method performs a process of winding a fiber bundle on the liner 20 while keeping inside of the liner 20 pressurized (process P60). This process P60 is also called helical layer forming process. The helical layer forming process employs the FW method to wind the fiber bundle on the liner 20 by helical winding and thereby form the helical layer 34. This helical winding winds the fiber bundle in a range including the dome portions 22 and 23 and the sheet layer 32 at the winding angle of 0 to 30 degrees with respect to the axis AX of the tank 10. In other words, this helical layer forming, process winds the fiber bundle on the sheet layer 32 and on the dome portions 22 and 23 of the liner 20.

Figure 8:
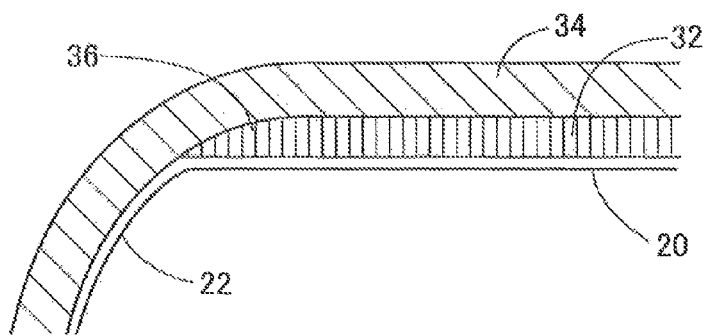
FIG. 8 is a schematic diagram illustrating the state that a helical layer is formed.

FIG. 8 is a schematic diagram illustrating the state that the helical layer 34 is formed by the helical layer forming process. FIG. 8 illustrates a partial section of the tank 10. According to this embodiment, the respective ends 36 and 37 of the sheet layer 32 are worked to the shape along the outer surfaces of the dome portions 22 and 23 by the ends working process described above, so that the fiber bundle is wound continuously without a difference in level at the boundary between the sheet layer 32 and the liner 20.

After performing the helical layer forming process, the manufacturing method performs a thermal curing process to integrally heat and cure the sheet layer 32 and the helical layer 34 (process P70 in FIG. 2). After performing the thermal curing process, the manufacturing method releases the pressurization of the liner 20 (process P80). The tank 10 is completed by this series of processes described above.

The manufacturing method of the tank 10 of the embodiment described above winds the fiber sheet 50 on the metal mandrel 40 having the higher rigidity than that of the resin liner 20. This allows for formation of the sheet layer 32 with applying the larger tensile force, compared with a method of winding the fiber sheet 50 on the liner 20. This reduces deflection of the fiber sheet 50. As a result, this improves the shape accuracy of the tank 10 and enhances the strength of the tank 10.

According to this embodiment, the inner surface of the reinforcement layer 30 is formed by using the fiber sheet 50. This reduces the irregularities on the inner surface of the reinforcement layer 30 and accordingly suppresses a variation in capacity of the tank 10.

According to this embodiment, formation of the reinforcement layer 30 first forms the sheet layer 32 using the fiber sheet 50. This provides a smooth surface which the helical layer 34 is in direct contact with i.e., smooth outer surface of the sheet layer 32). This accordingly suppresses meandering of the fiber bundle in the course of forming the helical layer 34. As a result, this enables the fiber bundle to be wound on the dome portions 22 and 23 with high accuracy and thereby enhances the strength of the entire tank 10 including the dome portions 22 and 23.

Additionally, according to this embodiment, the tensile force applied to the fiber sheet 50 is decreased toward the outer layer in the process of winding the fiber sheet 50. This suppresses wrinkling on the inner layer of the sheet layer 32 and thereby improves the shape accuracy of the tank 10.

According to this embodiment, the respective ends 36 and 37 of the sheet layer 32 are worked to the shape along the shapes of the outer surfaces of the dome portions 22 and 23 of the liner 20. This enables the fiber bundle to be wound continuously without a difference in level at the boundary between the sheet layer 32 and the liner 20. This accordingly improves the shape accuracy of the tank 10.

According to this embodiment, the respective ends 36 and 37 of the sheet layer 32 are worked to the shape along the shapes of the outer surfaces of the dome portions 22 and 23 of the liner 20. This suppresses a stress from being concentrated at the boundary between the sheet layer 32 and the liner 20 in the process of helically winding the fiber bundle. This accordingly enhances the strength of the entire tank 10.

According to this embodiment, the manufacturing method inserts the liner 20 into the sheet layer 32 and applies the internal pressure to the liner 20 after forming the sheet layer 32. This configuration enables the inside of the liner 20 to be held by the pressure in the process of forming the helical layer 34 and thereby further improves the shape accuracy of the tank 10.

According to this embodiment, part of the reinforcement layer 30 is formed by using the fiber sheet 50. This significantly shortens the time, period required for forming the reinforcement layer 30, compared with a method of forming the entire reinforcement layer 30 by the FW method. For example, while it takes one hour to form a layer (hoop layer) having the thickness corresponding to that of the sheet layer 32 by the FW method, it takes only about two minutes to form the sheet layer 32 by using the fiber sheet 50. This significantly enhances the production efficiency of the tank 10.

According to this embodiment, the fiber sheet 50 is used to form the sheet layer 32. The sheet layer 32 is accordingly free from clearances between fiber bundles and unnecessary overlaps of fiber bundles. This enhances the strength of the tank 10.

B. Modifications

The ends working process of the sheet layer 32 according to the above embodiment (process P30 in FIG. 2) may be omitted. For example, the respective ends 36 and 37 of the sheet layer 32 may be inclined by winding the sheet layer 50 formed in a trapezoidal shape.

According to the above embodiment, the ends working process is performed after the mandrel 40 is pulled out from the sheet layer 32. According to a modification, the ends working process may be performed before the mandrel 40 is pulled out from the sheet layer 32.

The liner used according to the above embodiment is the resin liner 20. The liner 20 made of a metal such as aluminum or iron may be used instead.

The helical layer 34 is formed according to the above embodiment. According to a modification, however, only the sheet layer 32 may be formed and formation of the helical layer 34 may be omitted, depending on the strength required for the tank 10 or the strength of the liner 20. In this modification, the outer diameter of the straight portion 21 of the liner 20 may be set to be approximately equal to the inner diameter of the sheet layer 32. The liner 20 may be cooled and contracted in advance before being inserted into the sheet layer 32. According to another modification, pressure may be continuously applied to inside of the liner 20, and the tank may be used in the state that the liner 20 is closely attached to the sheet layer 32.

According to the above embodiment, after inserting the liner 20 into the sheet layer 32, the manufacturing method forms the helical layer 34 with applying the internal pressure to the liner 20. According to a modification, however, the manufacturing method may form the helical layer 34 without applying the internal pressure, depending on the strength of the liner 20.

According to the above embodiment, the reinforcement layer 30 includes the sheet layer 32 and the helical layer 34. According to a modification, a sheet layer or a hoop layer may be provided additionally on the outer layer side of the helical layer 34. According to another modification, the manufacturing method may form a hoop layer or a helical layer on the mandrel 40 by the FW method and subsequently form a sheet layer on the hoop layer or the helical layer by the SW method.

According to the above embodiment, the helical layer forming process winds the fiber bundle on the sheet layer 32 as well as on the dome portions 22 and 23. According to a modification, the fiber bundle may be wound on only the sheet layer 32.

The invention is not limited to any of the embodiment and the modifications described above but may be implemented by a diversity of other configurations without departing from the scope of the invention. For example, the technical features of any of the embodiment and modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein.

What is claimed is:

1. A manufacturing method of a tank including a liner, the manufacturing method comprising:
   (A) a process of winding fibers in a sheet-like form impregnated with a resin on a mandrel having a higher rigidity than rigidity of the liner and heating and curing the wound fibers in the sheet-like form to form a sheet layer;
   (B) a process of pulling out the mandrel from the sheet layer; and
   (C) fitting the liner into the sheet layer, after the process (B).

2. The manufacturing method of the tank according to claim 1,
   wherein the liner has a straight portion formed in a cylindrical shape and curved dome portions provided on respective ends of the straight portion,
   the manufacturing method further comprising
   (D) a process of working respective ends of the sheet layer to a shape along shapes of outer surfaces of the dome portions, after the process (A).

3. The manufacturing method of the tank according to claim 1, further comprising
   (E) a process of winding a fiber bundle on the liner with applying a pressure to inside of the liner, after the process (C).

4. The manufacturing method of the tank according to claim 1, wherein the sheet layer is cylindrical.

\* \* \* \* \*